US011993486B2

(12) United States Patent
Cheng et al.

(10) Patent No.: US 11,993,486 B2
(45) Date of Patent: May 28, 2024

(54) APPARATUS AND METHOD FOR CONTROLLING PASSENGER TRANSPORTATION DEVICE

(71) Applicant: Otis Elevator Company, Farmington, CT (US)

(72) Inventors: Lifei Cheng, Hangzhou (CN); Zhaoxia Hu, Hangzhou (CN); Xinwei Gong, Haining (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 17/945,478

(22) Filed: Sep. 15, 2022

(65) Prior Publication Data

US 2023/0094547 A1 Mar. 30, 2023

(30) Foreign Application Priority Data

Sep. 17, 2021 (CN) ......................... 202111094087.X

(51) Int. Cl.
*B66B 25/00* (2006.01)

(52) U.S. Cl.
CPC .......... *B66B 25/003* (2013.01); *B66B 25/006* (2013.01)

(58) Field of Classification Search
CPC ...... B66B 25/003; B66B 25/006; B66B 25/00
See application file for complete search history.

(56) References Cited

U.S. PATENT DOCUMENTS 5,247,140 A * 9/1993 Iwasa ......................... B66B 1/32 318/757
5,526,256 A * 6/1996 Sakata .................. B66B 29/005 700/79

(Continued)

FOREIGN PATENT DOCUMENTS

EP 1508547 A1 * 2/2005 ............. B66B 25/00
EP 1508547 A1 2/2005

(Continued)

OTHER PUBLICATIONS

European Search Report for Application No. 22195988.5; dated Feb. 15, 2023; 8 Pages.

*Primary Examiner* — Gene O Crawford
*Assistant Examiner* — Abby A Jorgensen
(74) *Attorney, Agent, or Firm* — CANTOR COLBURN LLP

(57) ABSTRACT

The present application relates to a control system and a method for controlling a passenger conveying apparatus, and a computer-readable storage medium for implementing the method. A control apparatus for a passenger conveying apparatus according to an aspect of the present application comprises: a processor; a memory coupled with the processor; a communication module coupled with the processor; and a computer program stored on the memory and running on the processor, the running of the computer program causes: in response to an internal control command of the control apparatus or an external control command outside the control apparatus, determining whether there is a passenger boarding signal in the passenger conveying apparatus within a specified time interval, wherein the internal control command and the external control command comprise commands for starting or stopping the passenger conveying (Continued)

apparatus; and manipulating the passenger conveying apparatus based on the determining.

18 Claims, 5 Drawing Sheets

(56) References Cited

U.S. PATENT DOCUMENTS

| | | | | | |
|---|---|---|---|---|---|
| 6,049,189 | A * | 4/2000 | Markus | B66B 25/00 198/322 |
| 2017/0283212 | A1* | 10/2017 | Herkel | B66B 5/02 |
| 2018/0029839 | A1* | 2/2018 | Chen | G01P 3/38 |
| 2021/0309494 | A1* | 10/2021 | Fan | B66B 27/00 |

FOREIGN PATENT DOCUMENTS

| | | | | |
|---|---|---|---|---|
| EP | 1670712 A1 * | 6/2006 | B66B 25/00 |
| EP | 1670712 B1 | 8/2011 | |
| JP | 4737812 B2 * | 8/2011 | |
| WO | WO-03097507 A1 * | 11/2003 | B66B 25/00 |
| WO | WO-2005035423 A1 * | 4/2005 | B66B 25/00 |

* cited by examiner

APPARATUS AND METHOD FOR CONTROLLING PASSENGER TRANSPORTATION DEVICE

FOREIGN PRIORITY

This application claims priority to Chinese Patent Application No. 202111094087.X, filed Sep. 17, 2021, and all the benefits accruing therefrom under 35 U.S.C. § 119, the contents of which in its entirety are herein incorporated by reference.

TECHNICAL FIELD OF INVENTION

The present application relates to elevator technology, in particular to a control apparatus for a passenger conveying apparatus, a control system comprising the control apparatus, a method for controlling a passenger conveying apparatus, and a computer-readable storage medium for implementing the method.

BACKGROUND OF THE INVENTION

Escalators and moving walks are installed in large numbers in public facilities and commercial places (such as subway stations, railway stations, pedestrian bridges, shopping malls, etc.). Normally, escalators and moving walks are closed during non-operating period, and are activated when they enter operating period. At present, start-stop operations of escalators and moving walks are mainly done manually, which is time-consuming and labor-intensive and safety management relies on the sense of responsibility of the operators.

In order to improve efficiency and safety, remote video surveillance can be used to monitor the loading status of escalators and moving walks, and to determine whether to perform the start-stop operations. However, these methods have disadvantages such as high installation and maintenance costs and poor reliability. In addition, for the existing escalators and moving walks, the above-mentioned method also has the problem of high reconstruction cost.

SUMMARY OF THE INVENTION

According to one aspect of the present application, there is provided a control apparatus for a passenger conveying apparatus, comprising: a processor; a memory coupled with the processor; and a computer program stored on the memory and running on the processor, the running of the computer program causes: in response to an internal control command of the control apparatus or an external control command outside the control apparatus, determining whether there is a passenger boarding signal in the passenger conveying apparatus within a specified time interval, wherein the internal control command and the external control command comprise commands for starting or stopping the passenger conveying apparatus; and manipulate the passenger conveying apparatus based on the determining.

Optionally, in the above-mentioned control apparatus, when the internal control command or the external control command is a command for starting the passenger conveying apparatus, the specified time interval may be the time interval between the previous stopping of the operation of the passenger conveying apparatus and the generation of the internal control command or the receipt of the external control command.

Optionally, in the above-mentioned control apparatus, the specified time interval may be a time interval of a set length before the internal control command is generated or the external control command is received.

In addition to one or more features described above, the above-mentioned control apparatus may further include a timer, and the running of the computer program may also cause the internal control command to be periodically generated based on a timing signal of the timer.

In addition to one or more features described above, the above-mentioned control apparatus may further include a sensor disposed near an entrance of the passenger conveying apparatus, which may be coupled with the memory and configured to generate the passenger boarding signal when it detects that an object enters the passenger conveying apparatus, and the running of the computer program may also cause the generation time of the passenger boarding signal to be recorded in the memory.

In addition to one or more features described above, in the above-mentioned control apparatus, the running of the computer program may cause corresponding operating instructions on the passenger conveying apparatus to be generated in the following manner: if the determining is that there is no passenger boarding signal within the specified time interval, starting or stopping the passenger conveying apparatus and sending a message that the passenger conveying apparatus is in a normal state to an external device; if the determining is that there is a passenger boarding signal within the specified time interval, sending a message that the passenger conveying apparatus is in an abnormal state to the external device.

According to another aspect of the present application, there is provided a control system, comprising: a central control unit configured to generate external control commands for one or more passenger conveying apparatuses; and one or more control apparatuses, each of the control apparatuses is adapted to be disposed near or integrated in the respective passenger conveying apparatuses and comprises: a processor; a memory coupled with the processor; and a computer program stored on the memory and running on the processor, the running of the computer program causes: in response to an internal control command of the control apparatus or an external control command outside the control apparatus, determining whether there is a passenger boarding signal in the passenger conveying apparatus within a specified time interval, wherein the internal control command and the external control command comprise commands for starting or stopping the passenger conveying apparatus; and manipulating the passenger conveying apparatus based on the determining.

Optionally, in the above-mentioned control system, the central control unit may be configured to generate the external control command in response to an operation request from the cloud or the client, the operation request specifies device identification and operation type of the passenger conveying apparatus.

Optionally, in the above-mentioned control system, the central control unit may be configured to generate the external control command periodically.

Optionally, in the above-mentioned control system, when the internal control command or the external control command is a command for starting the operation of the passenger conveying apparatus, the specified time interval may be the time interval between the previous stopping of the passenger conveying apparatus and the generation of the internal control command or the receipt of the external control command.

Optionally, in the above-mentioned control system, the specified time interval may be a time interval of a set length before the internal control command is generated or the external control command is received.

In addition to one or more features described above, the above-mentioned control system may further include a timer, and the running of the computer program may also cause the internal control command to be periodically generated based on a timing signal of the timer.

In addition to one or more features described above, the above-mentioned control system may further include a sensor disposed near an entrance of the passenger conveying apparatus, which may be coupled with the memory and configured to generate the passenger boarding signal when it detects that an object enters the passenger conveying apparatus, and the running of the computer program may also cause the generation time of the passenger boarding signal to be recorded in the memory.

In addition to one or more features described above, in the above-mentioned control system, the running of the computer program may cause corresponding operating instructions on the passenger conveying apparatus to be generated in the following manner:

if the determining is that there is no passenger boarding signal within the specified time interval, starting or stopping the passenger conveying apparatus and sending a message that the passenger conveying apparatus is in a normal state to the central control unit; if the determining is that there is a passenger boarding signal within the specified time interval, send a message that the passenger conveying apparatus is in an abnormal state to the central control unit.

According to another aspect of the present application, there is provided a method for controlling a passenger conveying apparatus, comprising following steps performed by a control apparatus: in response to an internal control command of the control apparatus or an external control command outside the control apparatus, determining whether there is a passenger boarding signal in the passenger conveying apparatus within a specified time interval, wherein the internal control command and the external control command comprise commands for starting or stopping the passenger conveying apparatus; and manipulating the passenger conveying apparatus based on the determining.

Optionally, in the above-mentioned method, when the internal control command or the external control command is a command for starting the passenger conveying apparatus, the specified time interval may be the time interval between the previous stopping of the operation of the passenger conveying apparatus and the generation of the internal control command or the receipt of the external control command.

Optionally, in the above-mentioned method, the specified time interval may be a time interval of a set length before the internal control command is generated or the external control command is received.

In addition to one or more features described above, in the above-mentioned method, the internal control command may be generated periodically.

In addition to one or more features described above, in the above method, the step of manipulating the passenger conveying apparatus based on the determining may include: if the determining is that there is no passenger boarding signal within the specified time interval, starting or stopping the passenger conveying apparatus and send a message that the passenger conveying apparatus is in a normal state to an external device; if the determining is that there is a passenger boarding signal within the specified time interval, send a message that the passenger conveying apparatus is in an abnormal state to the external device.

According to another aspect of the present application, there is provided a computer-readable storage medium having instructions stored in the computer-readable storage medium, when the instructions are executed by a processor, the processor is caused to execute the method as described above.

BRIEF DESCRIPTION OF THE DRAWINGS

From the following detailed description in conjunction with the accompanying drawings, the above and/or other objects and advantages of the present application will become clearer and easier to understand, wherein the same or similar elements are represented with the same reference numerals. The accompanying drawings include.

DETAILED DESCRIPTION OF THE INVENTION

Hereinafter, the present application will be described more fully with reference to the accompanying drawings in which exemplary embodiments of the present application are illustrated. However, the present application can be implemented in different forms, and should not be interpreted as being limited to the embodiments given herein. The above-mentioned embodiments are provided to make the disclosure herein comprehensive and complete, so as to more comprehensively convey the protection scope of the present application to those skilled in the art.

In this specification, terms such as "comprising" and "including" mean that in addition to units and steps that are directly and clearly stated in the specification and claims, the technical solution of the application does not exclude the presence of other units and steps that are not directly and clearly stated in the specification and claims.

Unless otherwise specified, terms such as "first" and "second" do not indicate the order of the units in terms of time, space, size, etc., but are merely used to distinguish the units.

In this specification, "coupling" should be understood to include the case where electrical energy or electrical signals are directly transmitted between two units, or the case where electrical energy or electrical signals are indirectly transmitted through one or more third units.

In this specification, "passenger conveying apparatus" generally refers to various continuous conveying devices used to carry people and goods, which usually include escalators, moving walks, and other apparatuses with similar functions.

Figure 1:
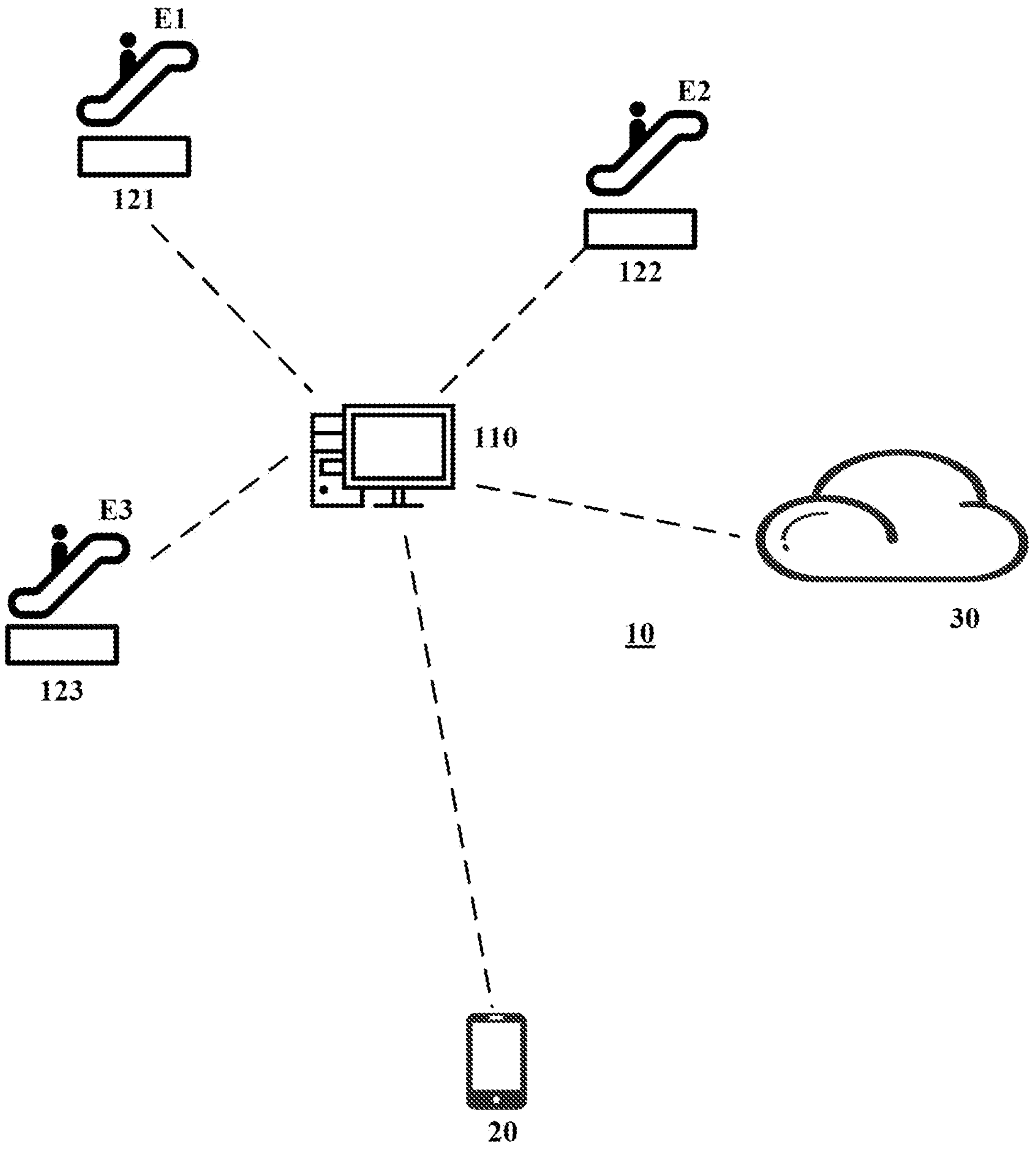
FIG. 1 is a schematic block diagram of a control system according to one or more embodiments of the present application.

FIG. 1 is a schematic block diagram of a control system according to one or more embodiments of the present application.

The control system 10 shown in FIG. 1 can control the operations of one or more passenger conveying apparatuses (such as escalators or moving walks), which includes a central control unit 110 and control apparatuses 121-123 capable of establishing a communication connection with the central control unit 110 (for example, in a wireless or wired manner). It should be pointed out that the number of control apparatuses in FIG. 1 is only exemplary, and it can also be one, two, or four or more. In the control system shown in FIG. 1, each control apparatus 121-123 is disposed near or integrated into the respective passenger conveying apparatuses E1-E3. The "respective passenger conveying apparatuses" mentioned herein refer to the passenger conveying apparatuses, each of which is controlled or manipulate by one of the corresponding control apparatuses.

Optionally, the central control unit 110 and the control apparatuses 121-123 can be constructed as a network (for example, a local area network), and the central control unit 110 can be configured as a node that implements the communication function with the cloud 20 and the client device 30.

In some embodiments, the central control unit 110 is configured to generate external control commands related to the passenger conveying apparatuses and send the generated external control commands to one or more of the control apparatuses 121-123, and then the control apparatuses 121-123 implement the control operations of the passenger conveying apparatuses or manipulate the passenger conveying apparatuses based on the external control commands. It should be pointed out that the "external control commands" mentioned herein refer to commands generated by other devices (such as a central control unit) located outside the control apparatuses 121-123 and related to controlling the operations of the passenger conveying apparatuses (for example, including but not limited to the start and stop of the passenger conveying apparatus, etc.). Correspondingly, the "internal control commands" to be mentioned below refer to commands generated by the control apparatuses 121-123 and related to controlling the operations of the passenger conveying apparatuses. The control apparatuses 121-123 can also implement the control operations of the passenger conveying apparatuses based on the internal control commands.

Optionally, the central control unit 110 generates an external control command based on an operation request regarding the passenger conveying apparatus received from the cloud 20 or the client 30 (for example, a mobile phone, a tablet computer, a PC, a notebook computer, etc.). Exemplarily, the operation request may include, for example, an indication of device identification and operation type of the passenger conveying apparatus. Therefore, the central control unit 110 may generate a corresponding external control command for the passenger conveying apparatus specified by the operation request, and the external control command is issued to the control apparatus associated with the specified passenger conveying apparatus (that is, the control apparatus that performs the control operation regarding the specified passenger conveying apparatus). Exemplarily, in the operation request, all the passenger conveying apparatuses or a part of the passenger conveying apparatuses may be specified as the object of the control operation, and the operation types include starting and stopping the operation of the passenger conveying apparatus, and so on.

Optionally, the central control unit 110 generates an external control command based on a set time period. Exemplarily, the central control unit 110 may be configured to periodically (for example, at a fixed time every day) generate a control command for starting the operation of the passenger conveying apparatus and a control command for stopping the operation of the passenger conveying apparatus.

In some embodiments of the present application, the process of generating the external control command can be initiated in the cloud or the client, which enables the user to remotely control the passenger conveying apparatus. In some other embodiments, the process of generating external control command can be initiated by the central control unit periodically, which can well meet the application situations where the passenger conveying apparatus needs to be started and stopped regularly.

In a further optional manner, the central control unit 110 may be configured to receive a feedback message indicating an execution result of an external control command or an internal control command from the control apparatuses 121-123, and present the received feedback message to the user.

In addition, the central control unit 110 may be installed in various locations, such as a central control room near or away from the passenger conveying apparatus.

Figure 2:
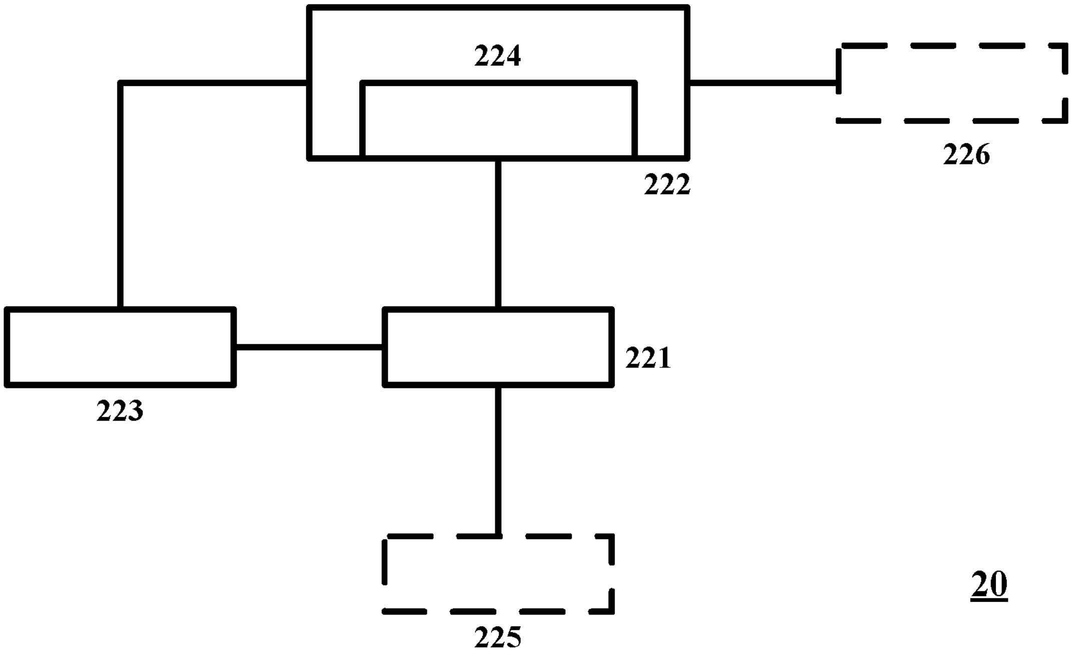
FIG. 2 is a schematic block diagram of a control apparatus for a passenger conveying apparatus according to one or more embodiments of the present application.

FIG. 2 is a schematic block diagram of a control apparatus for a passenger conveying apparatus according to one or more embodiments of the present application, which shows a specific implementation of the control apparatus in FIG. 1.

The control apparatus 220 shown in FIG. 2 includes a processor 221, a memory 222 coupled with the processor 221, a communication module 223 coupled with the processor 221, a computer program 224 stored in the memory 222 and running on the processor 221, timer 225 and sensor 226.

In some embodiments, the running of the computer program 224 on the processor 221 causes the following control operations to be performed:

When an internal control command is generated in the control apparatus 220 or an external control command is received from an external device (such as the central control unit 110 in FIG. 1) via the communication module 223, it will be determined whether to execute the internal control command or the external control command based on the existence of the passenger boarding signal, that is to say, it is determined whether there is a passenger boarding signal in the passenger conveying apparatus corresponding to the control apparatus 220 (for example, it is assumed as E1 in FIG. 1 here) within a specified time interval. Exemplarily, the time when the passenger boarding signal is generated is stored in the memory 222 for the computer program 224 to call when determining.

The method of determining whether to execute the control command according to the existence of the passenger boarding signal within a specified time interval provides a simple control logic with high reliability. In addition, many of the existing passenger conveying apparatuses have passenger boarding detection capabilities, so there is no need to add new hardware device, which will significantly reduce the cost and difficulty of upgrading the existing elevators.

The specified time interval described here should be broadly understood as a certain period of time that extends forward in time from the moment when the internal control command is generated or the external control command is received, and its length does not have to be fixed.

Optionally, when the internal control command is a command to start the operation of the passenger conveying apparatus, the specified time interval may be the time interval between the previous stop of the operation of the passenger conveying apparatus and the generation of the internal control command, and when the external control command is a command to start the operation of the passenger conveying apparatus, the specified time interval may be the time interval between the previous stop of the operation of the passenger conveying apparatus and the receipt of the external control command.

Figure 3A:
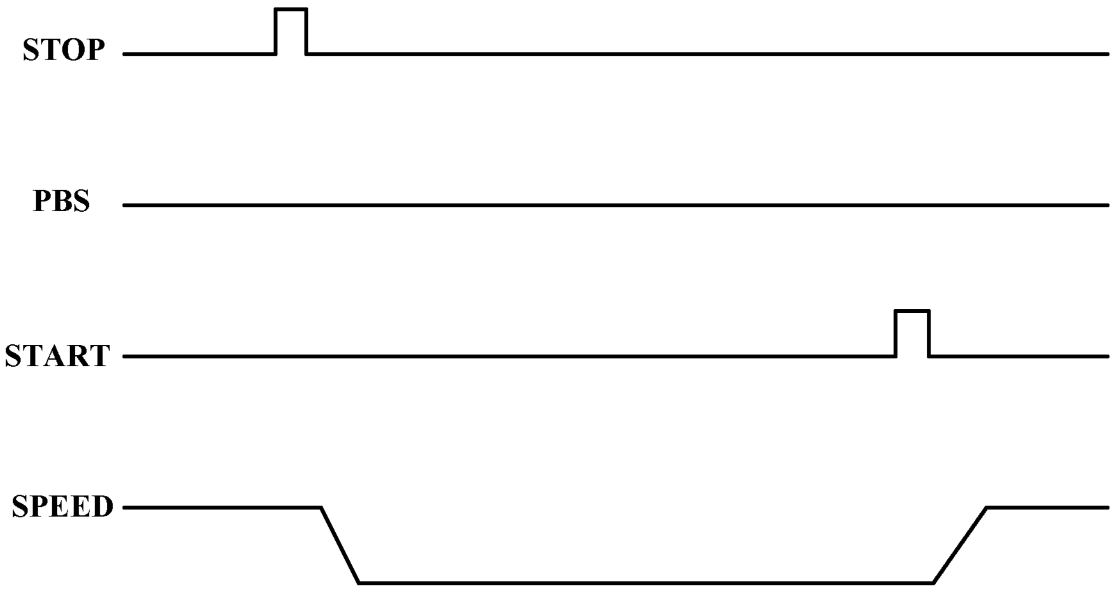
FIGS. 3A and 3B are timing diagrams of various signals of the passenger conveying apparatus.
Figure 3B:
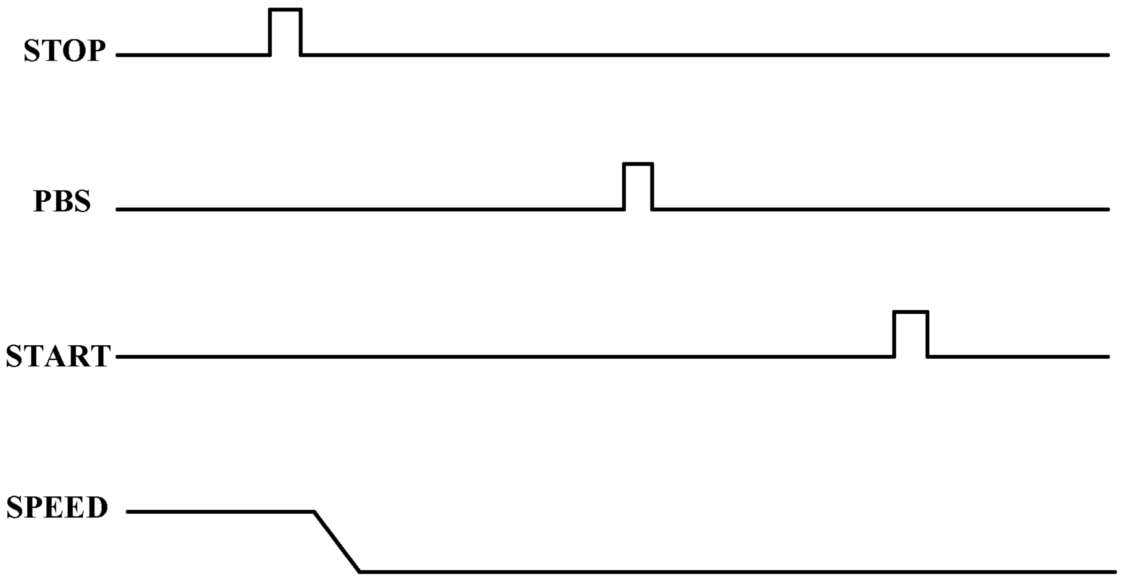

FIGS. 3A and 3B are timing diagrams of various signals of the passenger conveying apparatus. FIG. 3A shows a situation where there is no passenger boarding signal within a specified time interval, and FIG. 3B shows a situation where there is a passenger boarding signal within a specified time interval.

As shown in FIG. 3A, since there is no passenger boarding signal between the control signal STOP for the last time the passenger conveying apparatus stopped operation and the signal START for starting the operation of the passenger conveying apparatus this time, the control apparatus will start the operation of the passenger conveying apparatus after receiving the signal START, and the speed signal SPEED appears in the figure as gradually increasing from 0 to a predetermined level.

As shown in FIG. 3B, since there is a passenger boarding signal PBS between the control signal STOP for the last time the passenger conveying apparatus stopped operation and the signal START for starting the operation of the passenger conveying apparatus this time, the control apparatus will not start the operation of the passenger conveying apparatus after receiving the signal START, and accordingly, the speed signal SPEED appears as still being 0 in FIG. 3B.

As another alternative, the specified time interval may be a time interval of a set length before the internal control command is generated or the external control command is received, that is, a fixed-length period of time (for example, 5 minutes) extending forward in time with the end of the time when the internal control command is generated or the external control command is received.

In some embodiments of the present application, the presence of the passenger boarding signal is related to the selection of the specified time interval, due to the flexibility of the specified time interval in the setting (for example, the length can be fixed or variable, and the fixed length can also be long or short), so it can adapt to the needs of a variety of applications.

Continuing to refer to FIG. 2, optionally, the control apparatus 220 further includes a timer 225, and the timing signal generated by the timer 225 can be used to periodically generate internal control commands. In this way, the operation of the passenger conveying apparatus can be automatically started and stopped at regular intervals (for example, at a fixed time every day) without the intervention of external device.

Optionally, the control apparatus 220 shown in FIG. 2 includes a sensor 226, which may be disposed near an entrance of the passenger conveying apparatus. When the sensor 226 detects that an object enters the passenger conveying apparatus, it will generate a passenger boarding signal and trigger the operation of recording the generation time of the passenger boarding signal in the memory. The sensor 226 includes various types of sensors, comprising, but not limited to, a weighing sensor and an occlusion detection sensor (for example, an infrared sensor, an ultrasonic sensor, etc.).

Although in the arrangement shown in FIG. 2, the sensor is an integral part of the control apparatus 220, this is not necessary, and the sensor may also be an external unit of the control apparatus.

In some other embodiments, the running of the computer program 224 on the processor 221 causes the following control operations to be performed:

After completing the determination of the existence of the passenger boarding signal, the corresponding operation regarding the passenger conveying apparatus is performed according to the determining result. For example, if the determining result shows that there is no passenger boarding signal in the passenger conveying apparatus corresponding to the control apparatus 220 within the specified time interval, the operation will be performed according to the operation type specified in the internal or external control command (such as starting or stopping the operation of the passenger conveying apparatus), and the communication module 223 can also send a message that the operation is performed normally to an external device (such as the central control unit 110 in FIG. 1); if the determining result shows that there is a passenger boarding signal in the passenger conveying apparatus corresponding to the control apparatus 220 within the specified time interval, a message that the operation is performed abnormally is generated and sent to the external device via the communication module 223.

Optionally, regardless of whether the control command is generated internally or comes from an external device, the control apparatus 220 sends a message about the operation execution result to the external device.

Figure 4:
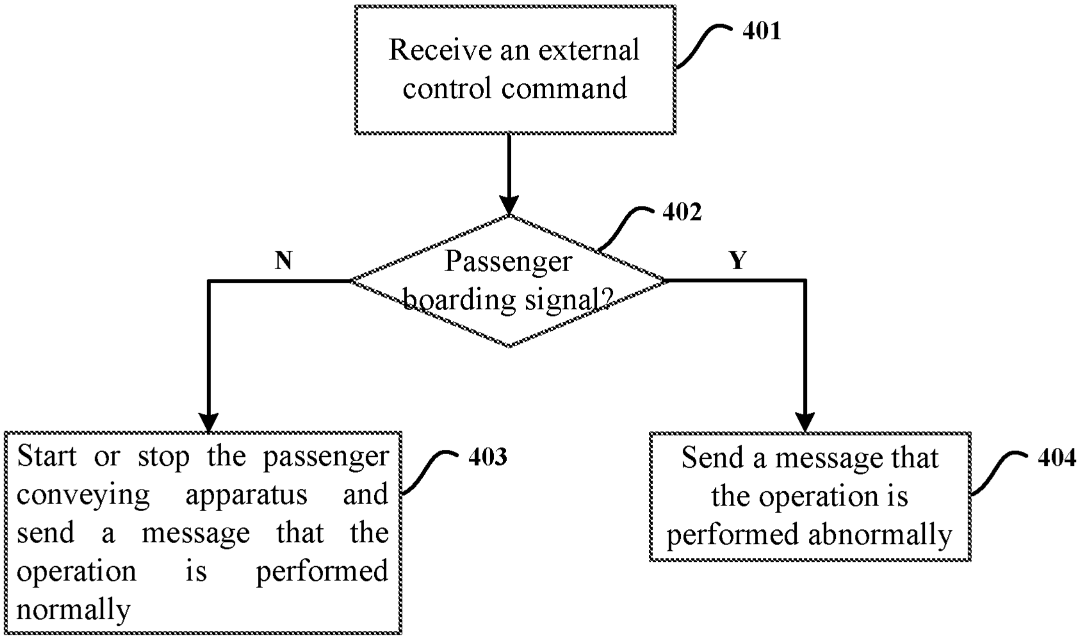
FIG. 4 is a flowchart of a method for controlling a passenger conveying apparatus according to one or more embodiments of the present application.

FIG. 4 is a flowchart of a method for controlling a passenger conveying apparatus according to one or more embodiments of the present application.

Exemplarily but not necessarily, the method shown in FIG. 4 is implemented by means of the control apparatus shown in FIG. 2. It is not difficult for those skilled in the art to understand that the method shown in FIG. 4 is not limited to being implemented in the specific example of the control apparatus described in this specification.

As shown in FIG. 4, the method for controlling the passenger conveying apparatus includes the following steps:

Step 401: The control apparatus 220 receives an external control command from an external device (such as a central control unit) via the communication module 223, and the control command may include a command to start or stop the operation of the passenger conveying apparatus.

Step 402: In response to the external control command received in step 401, the control apparatus 220 determines whether there is a passenger boarding signal in the passenger conveying apparatus within a specified time interval.

Alternatively, when the external control command is a command to start the operation of the passenger conveying apparatus, the specified time interval may be the time interval between the previous stop of the operation of the passenger conveying apparatus and the receipt of the external control command.

Another alternative is to select a time interval of a set length before the external control command is received as the specified time interval.

In step 402, if it is determined that there is no passenger boarding signal, the flow shown in FIG. 4 proceeds to step 403; otherwise, it proceeds to step 404.

Step 403: Start or stop the operation of the passenger conveying apparatus and send a message that the operation is performed normally to an external device.

Step 404: Send a message that the operation is performed abnormally to the external device.

Figure 5:
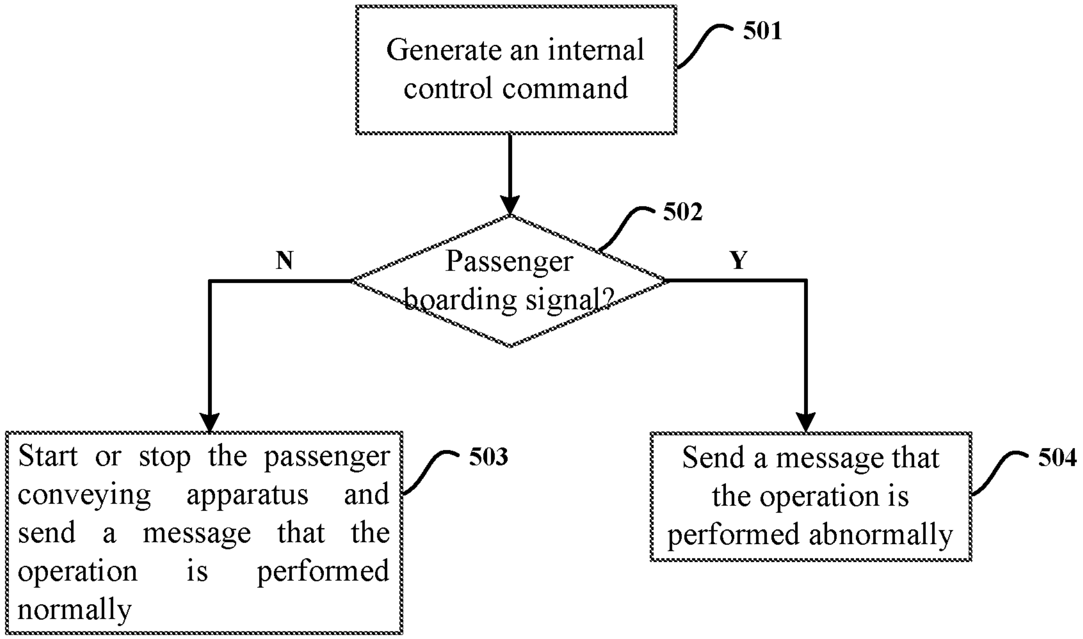
FIG. 5 is a flowchart of a method for controlling a passenger conveying apparatus according to one or more embodiments of the present application.

FIG. 5 is a flowchart of a method for controlling a passenger conveying apparatus according to one or more embodiments of the present application.

Exemplarily but not necessarily, the method shown in FIG. 5 is implemented by means of the control apparatus shown in FIG. 2. It is not difficult for those skilled in the art to understand that the method shown in FIG. 5 is not limited to being implemented in the specific example of the control apparatus described in this specification.

As shown in FIG. 5, the method for controlling the passenger conveying apparatus includes the following steps: Step 501: The control apparatus 220 generates an internal control command based on the timing signal of the timer. The control command may include a command to start or stop the operation of the passenger conveying apparatus.

Step 502: In response to the internal control command generated in step 501, the control apparatus 220 determines whether there is a passenger boarding signal in the passenger conveying apparatus within a specified time interval.

Alternatively, when the external control command is a command to start the operation of the passenger conveying apparatus, the specified time interval may be the time interval between the previous stop of the operation of the passenger conveying apparatus and the receipt of the external control command.

Another alternative is to select a time interval of a set length before the external control command is received as the specified time interval.

In step 502, if it is determined that there is no passenger boarding signal, the flow shown in FIG. 5 proceeds to step 503; otherwise, it proceeds to step 504.

Step 503: Start or stop the operation of the passenger conveying apparatus and send a message that the operation is performed normally to an external device.

Step 504: Send a message that the operation is performed abnormally to the external device.

According to another aspect of the present application, there is also provided a computer-readable storage medium on which a computer program is stored. When the program is executed by the processor, one or more steps included in the methods described above with reference to FIGS. 4 and 5 are implemented.

The computer-readable storage medium referred to in the application includes various types of computer storage media, and may be any available medium that can be accessed by a general-purpose or special-purpose computer. For example, the computer-readable storage medium may include RAM, ROM, EPROM, E2PROM, registers, hard disks, removable disks, CD-ROM or other optical disk storage, magnetic disk storage or other magnetic storage devices, or any other transitory or non-transitory medium that can be used to carry or store a desired program code unit in the form of instructions or data structures and that can be accessed by a general-purpose or special-purpose computer or a general-purpose or special-purpose processor. Disks as used herein usually copy data magnetically, while discs use lasers to optically copy data. The above combination should also be included in the protection scope of the computer-readable medium. An exemplary storage medium is coupled to the processor such that the processor can read and write information from and to the storage medium. In the alternative, the storage medium may be integrated into the processor. The processor and the storage medium may reside in the ASIC. The ASIC may reside in the user terminal. In the alternative, the processor and the storage medium may reside as discrete components in the user terminal.

Those skilled in the art will understand that the various illustrative logical blocks, modules, circuits, and algorithm steps described herein may be implemented as electronic hardware, computer software, or combinations of both.

To illustrate this interchangeability of hardware and software, various illustrative components, blocks, modules, circuits, and steps have been described above generally in terms of their functionality above. Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present application.

Although only some of the specific implementations of the application are described, those skilled in the art should understand that the application can be implemented in many other forms without departing from the spirit and scope of the application. Therefore, the presented examples and implementations are regarded as illustrative rather than restrictive, and the application may cover various modifications and replacements without departing from the spirit and scope of the application as defined by the appended claims.

The embodiments and examples proposed herein are provided in order to best illustrate the embodiments according to the present technology and its specific applications, and thereby enable those skilled in the art to implement and use the present application. However, those skilled in the art will know that the above description and examples are provided only for ease of description and examples. The presented description is not intended to cover every aspect of the application or to limit the application to the precise form disclosed.

What is claimed is:

1. A control apparatus for a passenger conveying apparatus, comprising:

a processor;

a memory coupled with the processor; and a computer program stored on the memory and running on the processor, the running of the computer program causes:

in response to an internal control command of the control apparatus or an external control command outside the control apparatus, determining whether there is a passenger boarding signal in the passenger conveying apparatus within a specified time interval, wherein the internal control command and the external control command comprise commands for starting or stopping the passenger conveying apparatus; and manipulating the passenger conveying apparatus based on the determining;

wherein, when the internal control command or the external control command is one for starting the passenger conveying apparatus, the specified time interval is a time interval between a previous stopping of the passenger conveying apparatus and generation of the internal control command or the receipt of the external control command for starting the passenger conveying apparatus;

upon determining that there is a passenger boarding signal within the specified time interval, sending a message that the passenger conveying apparatus is not to be started.

2. The control apparatus according to claim 1, wherein the specified time interval is a time interval of a set length before the internal control command is generated or the external control command is received.

3. The control apparatus according to claim 1, further comprising a timer, and the running of the computer program also causes the internal control command to be periodically generated based on a timing signal of the timer.

4. The control apparatus according to claim 1, further comprising a sensor disposed near an entrance of the passenger conveying apparatus, which is coupled with the memory and configured to generate the passenger boarding signal when it detects that an object enters the passenger conveying apparatus, and the running of the computer program also causes the generation time of the passenger boarding signal to be recorded in the memory.

5. The control apparatus according to claim 1, wherein the running of the computer program causes corresponding operating instructions on the passenger conveying apparatus to be generated in the following manner:

if the determining is that there is no passenger boarding signal within the specified time interval, starting or stopping the passenger conveying apparatus and sending a message that the passenger conveying apparatus is in a normal state to an external device;

if the determining is that there is a passenger boarding signal within the specified time interval, sending a message that the passenger conveying apparatus is in an abnormal state to the external device.

6. A control system, comprising:

a central control unit configured to generate external control commands for one or more passenger conveying apparatuses; and one or more control apparatuses, each of the one or more control apparatuses is adapted to be disposed near or integrated in a respective passenger conveying apparatuses and comprises:

a processor;

a memory coupled with the processor; and a computer program stored on the memory and running on the processor, the running of the computer program causes:

in response to an internal control command of the one or more control apparatuses or an external control command outside the one or more control apparatuses, determining whether there is a passenger boarding signal in the passenger conveying apparatus within a specified time interval, wherein the internal control command and the external control command comprise commands for starting or stopping the passenger conveying apparatus; and manipulating the passenger conveying apparatus based on the determining;

wherein, when the internal control command or the external control command is one for starting the passenger conveying apparatus, the specified time interval is a time interval between a previous stopping of the passenger conveying apparatus and generation of the internal control command or the receipt of the external control command for starting the passenger conveying apparatus;

upon determining that there is a passenger boarding signal within the specified time interval, sending a message that the passenger conveying apparatus is not to be started.

7. The control system according to claim 6, wherein the central control unit is configured to generate the external control command in response to an operation request, the operation request specifies a device identification and an operation type of the passenger conveying apparatus.

8. The control system according to claim 6, wherein the central control unit is configured to generate the external control command periodically.

9. The control system according to claim 6, wherein the specified time interval is a time interval of a set length before the internal control command is generated or the external control command is received.

10. The control system according to claim 6, further comprising a timer, and the running of the computer program also causes the internal control command to be periodically generated based on a timing signal of the timer.

11. The control system according to claim 6, further comprising a sensor disposed near an entrance of the passenger conveying apparatus, which is coupled with the memory and configured to generate the passenger boarding signal when it detects that an object enters the passenger conveying apparatus, and the running of the computer program also causes the generation time of the passenger boarding signal to be recorded in the memory.

12. The control system according to claim 6, wherein the running of the computer program causes corresponding operating instructions on the passenger conveying apparatus to be generated in the following manner:

if the determining is that there is no passenger boarding signal within the specified time interval, starting or stopping the passenger conveying apparatus and sending a message that the passenger conveying apparatus is in a normal state to the central control unit;

if the determining is that there is a passenger boarding signal within the specified time interval, sending a message that the passenger conveying apparatus is in an abnormal state to the central control unit.

13. A method for controlling a passenger conveying apparatus, comprising following steps performed by a control apparatus:

in response to an internal control command of the control apparatus or an external control command outside the control apparatus, determining whether there is a passenger boarding signal in the passenger conveying apparatus within a specified time interval, wherein the internal control command and the external control command comprise commands for starting or stopping the passenger conveying apparatus; and manipulating the passenger conveying apparatus based on the determining;

wherein, when the internal control command or the external control command is one for starting the passenger conveying apparatus, the specified time interval is a time interval between a previous stopping of the passenger conveying apparatus and generation of the internal control command or the receipt of the external control command for starting the passenger conveying apparatus;

upon determining that there is a passenger boarding signal within the specified time interval, sending a message that the passenger conveying apparatus is not to be started.

14. The method according to claim 13, wherein, when the internal control command or the external control command is a command for starting the passenger conveying apparatus, the specified time interval is a time interval between a previous stopping of the passenger conveying apparatus and generation of the internal control command or the receipt of the external control command.

15. The method according to claim 13, wherein the specified time interval is a time interval of a set length before the internal control command is generated or the external control command is received.

16. The method according to claim 13, wherein the internal control command is generated periodically.

17. The method according to claim 13, wherein manipulating the passenger conveying apparatus based on the determining further comprises:

if the determining is that there is no passenger boarding signal within the specified time interval, starting or stopping the passenger conveying apparatus and sending a message that the passenger conveying apparatus is in a normal state to an external device;

if the determining is that there is a passenger boarding signal within the specified time interval, sending a message that the passenger conveying apparatus is in an abnormal state to the external device.

18. A computer-readable storage medium having instructions stored in the computer-readable storage medium, when the instructions are executed by a processor, the processor is caused to execute a method comprising:

in response to an internal control command of the control apparatus or an external control command outside the control apparatus, determining whether there is a passenger boarding signal in the passenger conveying apparatus within a specified time interval, wherein the internal control command and the external control command comprise commands for starting or stopping the passenger conveying apparatus; and manipulating the passenger conveying apparatus based on the determining;

wherein, when the internal control command or the external control command is one for starting the passenger conveying apparatus, the specified time interval is a time interval between a previous stopping of the passenger conveying apparatus and generation of the internal control command or the receipt of the external control command for starting the passenger conveying apparatus;

upon determining that there is a passenger boarding signal within the specified time interval, sending a message that the passenger conveying apparatus is not to be started.

* * * * *